United States Patent
Wollesen

(10) Patent No.: US 9,567,803 B2
(45) Date of Patent: Feb. 14, 2017

(54) FEEDING FENCE SECTION

(71) Applicant: COW-WELFARE A/S, Haderslev (DK)

(72) Inventor: Tommy Wollesen, Rødekro (DK)

(73) Assignee: COW-WELFARE A/S, Haderslev (DK)

( * ) Notice: Subject to any disclaimer, the term of this patent is extended or adjusted under 35 U.S.C. 154(b) by 0 days.

(21) Appl. No.: 14/410,147

(22) PCT Filed: Jul. 1, 2013

(86) PCT No.: PCT/DK2013/050218
§ 371 (c)(1),
(2) Date: Dec. 22, 2014

(87) PCT Pub. No.: WO2014/005592
PCT Pub. Date: Jan. 9, 2014

(65) Prior Publication Data
US 2015/0322716 A1    Nov. 12, 2015

(30) Foreign Application Priority Data
Jul. 5, 2012 (DK) .................................. 2012 70401

(51) Int. Cl.
| | |
|---|---|
| *A01K 1/10* | (2006.01) |
| *A01K 5/00* | (2006.01) |
| *A01K 5/01* | (2006.01) |
| *A01K 39/00* | (2006.01) |
| *E06B 11/02* | (2006.01) |

(Continued)

(52) U.S. Cl.
CPC .............. *E06B 11/027* (2013.01); *A01K 1/10* (2013.01); *A01K 1/105* (2013.01); *A01K 5/01* (2013.01); *A01K 29/00* (2013.01); *E04H 17/00* (2013.01)

(58) Field of Classification Search
CPC ............ A01K 5/01; A01K 29/00; A01K 1/10; A01K 1/105; A01K 1/06; A01K 1/0606; A01K 1/0613; A01K 1/062; A01K 1/08; A01K 5/025; E06B 11/027; E06B 11/02; E06B 11/022; E04H 17/00; E04H 17/16; E04H 17/18
USPC ...... 119/52.4, 58–60, 61.1, 63–64, 734–739, 119/743–744, 747, 750, 61.2, 51.01, 729, 119/730, 731, 733, 62, 740, 741, 742
See application file for complete search history.

(56) References Cited

U.S. PATENT DOCUMENTS 64,017 A * 4/1867 Manley .................. A01K 1/062
119/744
68,151 A * 8/1867 Beals ....................... A01K 1/10
119/59

(Continued)

FOREIGN PATENT DOCUMENTS

| AU | 482578 B2 | 8/1975 |
|---|---|---|
| DE | 8116483 U1 | 9/1981 |

(Continued)

*Primary Examiner* — Jennifer E Novosad
(74) *Attorney, Agent, or Firm* — Dinsmore & Shohl LLP; Douglas Wathen

(57) ABSTRACT

A feeding fence section suitable for separating a feeding area for animals and a feed-holding part, where the feeding fence section is provided with a flexible mounting element, which allows the fence section to be angularly displaced by the animals from a starting position towards a tilted position about a substantially horizontal, longitudinal axis, wherein the mounting elements are biasing the fence section from the tilted position towards the starting position.

16 Claims, 5 Drawing Sheets

(51) Int. Cl.
*A01K 29/00* (2006.01)
*E04H 17/00* (2006.01)

(56) References Cited

U.S. PATENT DOCUMENTS

| | | | | |
|---|---|---|---|---|
| 76,810 A | * | 4/1868 | Putnam | A01K 39/01 119/61.2 |
| 273,116 A | * | 2/1883 | Manning | A01K 5/01 119/63 |
| 402,145 A | * | 4/1889 | Critchfield et al. | A01K 1/10 119/59 |
| 916,222 A | * | 3/1909 | Thomas | A01K 5/01 119/63 |
| 1,239,170 A | * | 9/1917 | Ferris | A01K 5/01 119/63 |
| 1,261,991 A | * | 4/1918 | Ahern | A01K 5/01 119/63 |
| 1,413,410 A | * | 4/1922 | Langer | A01K 5/01 119/515 |
| 1,435,158 A | * | 11/1922 | Guyette | A01K 1/062 119/741 |
| 1,481,108 A | * | 1/1924 | Neller | A01K 5/01 119/63 |
| 1,596,077 A | * | 8/1926 | Clay | A01K 5/01 119/63 |
| 1,949,189 A | * | 2/1934 | Smith | A01K 1/06 119/516 |
| 2,515,458 A | * | 7/1950 | Marr | A01K 1/0606 119/741 |
| 2,592,736 A | * | 4/1952 | Puckett | E06B 11/02 49/131 |
| 2,626,591 A | | 1/1953 | Mazur et al. | |
| 2,648,308 A | * | 8/1953 | Ogden | A01K 1/06 119/745 |
| 2,752,640 A | | 7/1956 | Mazur | |
| 2,754,803 A | * | 7/1956 | Stammel | A01K 1/0606 119/741 |
| 2,815,735 A | | 12/1957 | Collier | |
| 3,046,941 A | * | 7/1962 | De Filippi | A01K 1/0606 119/740 |
| 3,170,258 A | * | 2/1965 | Ohlhausen | E01F 13/08 49/12 |
| 3,220,384 A | * | 11/1965 | Trefz | A01K 1/0613 119/732 |
| 3,734,059 A | * | 5/1973 | Rodrigues | A01K 1/0613 119/520 |
| 4,930,449 A | | 6/1990 | Harton | |
| 4,951,608 A | * | 8/1990 | Reisgies | A01K 1/105 119/14.03 |
| 5,289,798 A | * | 3/1994 | Lock | A01K 1/0606 119/58 |
| 5,303,673 A | * | 4/1994 | Weelink | A01K 1/105 119/60 |
| 5,433,172 A | * | 7/1995 | Weelink | A01K 1/105 119/57.92 |
| 5,694,887 A | * | 12/1997 | Vandenberg | A01K 1/0606 119/740 |
| 6,039,002 A | * | 3/2000 | Strankman | A01K 1/105 119/57.1 |
| 6,205,951 B1 | * | 3/2001 | Sprik | A01K 1/105 119/60 |
| 6,601,536 B2 | * | 8/2003 | Sprik | A01K 1/105 119/502 |
| 7,493,872 B1 | * | 2/2009 | McCully | A01K 15/027 119/51.01 |
| 7,784,431 B2 | * | 8/2010 | Hatfield | A01K 1/0606 119/739 |
| 2008/0217598 A1 | * | 9/2008 | Dombroski | E04H 17/16 256/24 |
| 2015/0322716 A1 | * | 11/2015 | Wollesen | A01K 1/10 119/63 |

FOREIGN PATENT DOCUMENTS

| | | |
|---|---|---|
| EP | 0579920 A2 | 1/1994 |
| FR | 2866199 A1 | 8/2005 |
| GB | 2259437 A | 3/1993 |
| NL | 8503066 A | 6/1987 |
| NL | 8800878 A | 6/1990 |
| SE | 469918 B | 10/1993 |

* cited by examiner

FEEDING FENCE SECTION

CROSS-REFERENCE TO RELATED APPLICATIONS

This application is the U.S. National Phase of PCT/DK2013/050218 filed Jul. 1, 2013, which claims priority of Danish Patent Application PA 2012 70401 filed Jul. 5, 2012.

The present invention relates to a feeding fence section for a feeding fence separating a feeding area for animals, in particular for cows, and a feed-holding part, such as a feeding table.

BACKGROUND

Feeding fences, also known as feeding barriers and in particular embodiments as head gates, have been known for centuries for separating the area where the animals are enclosed and the area where the feed for the animals are provided, commonly known as the feeding table. The feeding fence prevents the animals from soiling the feed and may furthermore be provided with head openings for the individual animal to allow the animals to eat undisturbed by the neighbouring animals.

In case some of the feed is placed on the feeding table outside the reach of the animals, they may push so strongly against the feeding fence that they may inflict injuries on themselves and care should be taken when feeding the animals that all feed is placed within reach of the animals, and the feeding fence is normally designed to reduce the risk of such injuries. It has been found that cows may apply a force of more than 800 Newton with their shoulders and forepart against the feeding fence in order to try to reach feed, and it has been found that forces above 500 Newton may cause injuries to the cows in the long run.

Feeding fences that are displaceable, either by a motor or by being pushed by the animals, are also known in the art form e.g. U.S. Pat. No. 5,433,172, GB 2 259 437 and from U.S. Pat. No. 6,039,002 so that a larger amount of feed may be arranged at the feeding table and gradually come into reach for the animals, whereby the feed may be distributed to the feeding table less frequently.

BRIEF DESCRIPTION OF THE PRESENT INVENTION

The present invention relates to a feeding fence section suitable for separating a feeding area for animals and a feed-holding part, the feeding fence section being provided with flexible mounting means which allows the fence section to be angularly displaced by said animals from a starting position towards a tilted position about a substantially horizontal axis extending in the longitudinal direction of said fence section and wherein the mounting means are biasing the fence section from said tilted position towards the starting position.

By allowing the animals to move the feeding fence section when leaning towards it or actually pushing against the feeding fence section and thus allow the feeding fence section to follow the movements of the animal, it has shown to be possible to prevent most self-inflicted injuries on the animals, in particular cows, such as dairy cattle, when they push against the feeding fence. Furthermore, the cows apparently find the feeding fence sections according to the present invention to be more pleasant and it has been found that the animals stay at the feeding fence for a longer time and overall consume more of the feed which is advantageous.

The feed-holding part may be a crib having a cavity for holding the feed or a feeding table having a substantially flat surface upon which the feed for the animals is placed.

It should be noted that the term "mounting means are biasing . . . " in this context should be understood as the mounting means comprises active biasing means—such as motors, linear actuators or other—or passive biasing means—such as a coil spring, gas spring, rubber blocks or similar resilient means—enabling that the mounting means will try to force the fence section towards the starting position as soon as the fence section is angularly displaced away from the starting position.

It should also be understood that the term "horizontal axis extending in the longitudinal direction of said fence section" in this context means that the axis is substantially horizontally and that it extends in the horizontal direction in which the fence section extends i.e. the axis extends in a direction perpendicular to the longitudinal extent of a cow using the fence section as it is supposed to be used. In other words the axis will typically extend substantially parallel with the feed-holding part (and thus the fence sections).

The mounting means are preferably arranged to bias the fence section with a biasing force that is a function of the angular deviation (a) of the fence section from the starting position. The function may in particular be a linear function such as one achieved by means of a spring, in particular a torsional spring. The feeding fence section is preferably arranged so that it can be displaced towards the feed-holding part only.

The starting position is in a preferred embodiment a substantially upright position. However, the starting position may alternatively be a tilted position where the top of the feeding fence section is slightly tilted towards the feed-holding part with e.g. 5 to 10° to vertical.

The maximal deviation of the fence section from an upright position is in the range of 25° to 35°. This provides sufficient movability of the fence section to obtain the advantages without risking that the animal loses balance and falls and that the upper edge of the fence section will still be at a height to prevent the animals from crossing the fence.

The feeding fence section comprises at least one passage opening for the head of one animal. However, it is preferred that the feeding fence section comprises a plurality of passage openings for the heads of animals, such as from two to twelve passage openings, preferably in the range from three to six passage openings so that a plurality of animals are able to feed through the openings of one fence section simultaneous and at the same time push against the fence section to tilt it towards the feed-holding part. The passage openings are preferably open at the top of the fence section so as to allow the animals to insert and retract their heads from the top of the passage openings, i.e. vertically from above the fence section and into the passage openings.

The flexible mounting means comprises preferably at least one part of an elastic material which is arranged to be twisted, i.e. act as a torsional spring, when the fence section is in a tilted position and thus provide biasing force to the fence section to force the tilted fence section towards the starting position, where the biasing force is substantially linearly depending on the angular deviation of the fence section from the starting position. The elastic material is preferably a natural rubber material, an artificial rubber material or a combination thereof.

In an alternative embodiment, the feeding fence section may be mounted on helical springs, e.g. mounted vertically on an edge part of the floor construction, where the springs will be bent in a tilted position of the feeding fence.

The flexible mounting means are preferably arranged to be connected to stationary vertical posts for supporting the feeding fence section.

The feeding fence section may in a particular embodiment comprise a plurality of upright members each attached at a lower end to a substantially horizontal longitudinal bottom bar of the feeding fence section and extending to an upper free end of the member, wherein the upright members are hollow tubes made from a deflectable material, in particular from PPR (polypropylene random copolymer). This provides for a simple construction of the feeding fence section and the deflectable properties of the tubes provides for greater comfort for the animals and further reduces the risk of self-inflicted injuries on the animals due to pushing at the feeding fence.

The distance between neighbouring upright members, i.e. the distance between the centrelines of the upright members, is preferably in the range from 15 or 20 to 40 or 50 cm so as to allow for cattle to insert the head between to neighbouring upright members and feed from the feed-holding part. For young calves, a spacing of about 15 cm is suitable, whereas a spacing of 30 to 35 cm will fit large cows. Since the upright members will deflect to the sides when an animal enters its heat between them, there will be at least two upright members between two neighbouring cows.

The length of the feeding fence section in the longitudinal direction is preferably in the range of 1.5 or 2 to 6 meters, more preferably in the range of 2.5 to 5 meters.

The present invention furthermore relates to a feeding fence comprising a plurality of feeding fence sections according to the invention, wherein the feeding fence sections are arranged.

The present invention also relates to a stable comprising a feed-holding part for the animals, a feed-holding part, and a feeding fence according to the invention and separating the feeding area and the feed-holding part.

In an aspect of the invention the substantially horizontal axis is arranged to extend at a bottom part of the feeding fence section.

Arranging the axis—around which the fence section is rotatably displaceable—at a bottom part of the feeding fence section i.e. beneath the neck of the cow when it uses the fence section, is advantageous in that it ensures that pressure is relieved on the shoulders of the cow while at the same time not encouraging the cow to step forward since the arrangement below its neck substantially does not move forward.

In an aspect of the invention the flexible mounting means is arranged at a first longitudinal end of the feeding fence section and wherein the flexible mounting means is also arranged at an opposite longitudinal end of said feeding fence section.

Arranging the flexible mounting means at both ends of the feeding fence section is advantageous in that it entail a simpler fence section design and a simpler mounting procedure.

In an aspect of the invention the flexible mounting means are arranged at a bottom part of the feeding fence section.

Arranging the flexible mounting means at the bottom part of the feeding fence section enables that they can be substantially aligned with the axis around which the fence section is capable of rotation. This is advantageous in that it enables a simpler mounting means design and it that in this mounting position it is easier to protect the mounting means from damaging external impact that if they e.g. where arranged at the top of the fence sections where they would have to span the gap when the fence section is pushed forward.

BRIEF DESCRIPTION OF THE FIGURES

Embodiments of the present invention are illustrated in the accompanying drawing of which

DETAILED DESCRIPTION OF AN EMBODIMENT OF THE INVENTION

Figure 1:
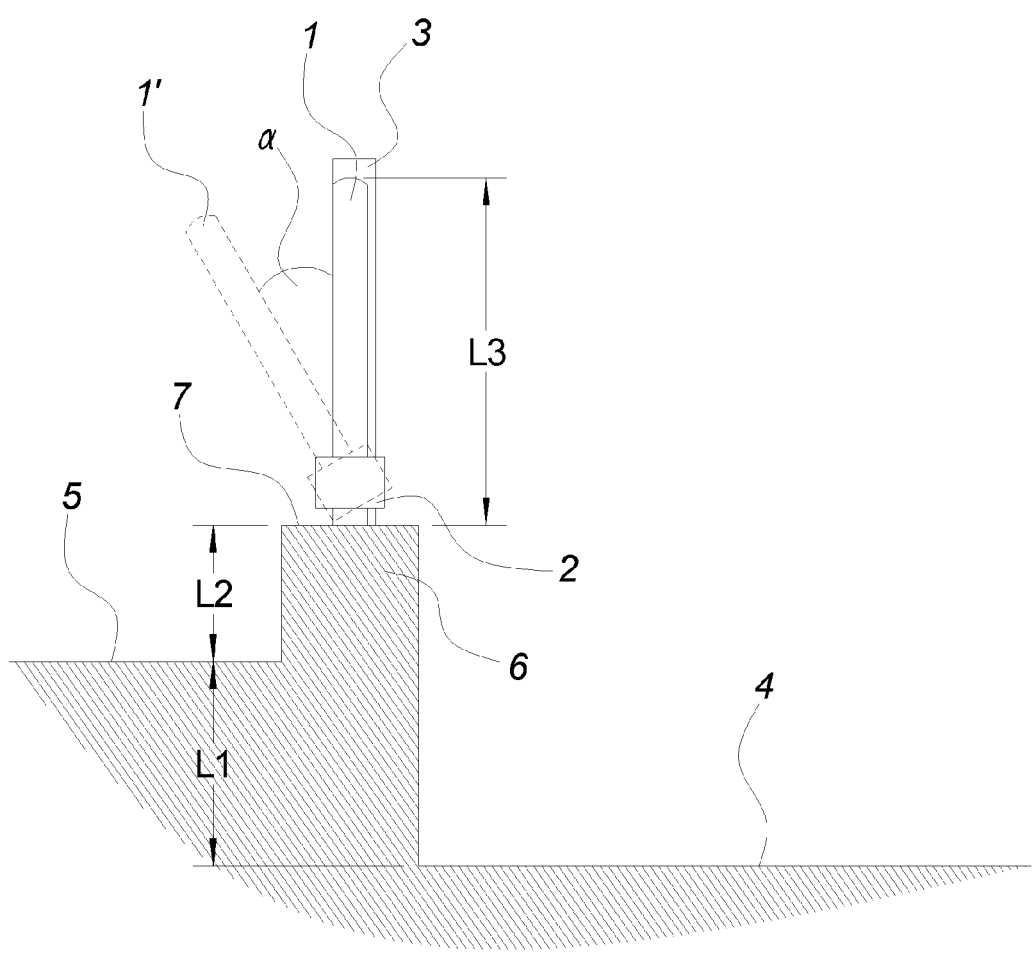
FIG. 1 is a cross-sectional view of a feeding stable arrangement employing a feeding fence section according to the present invention.
Figure 2:
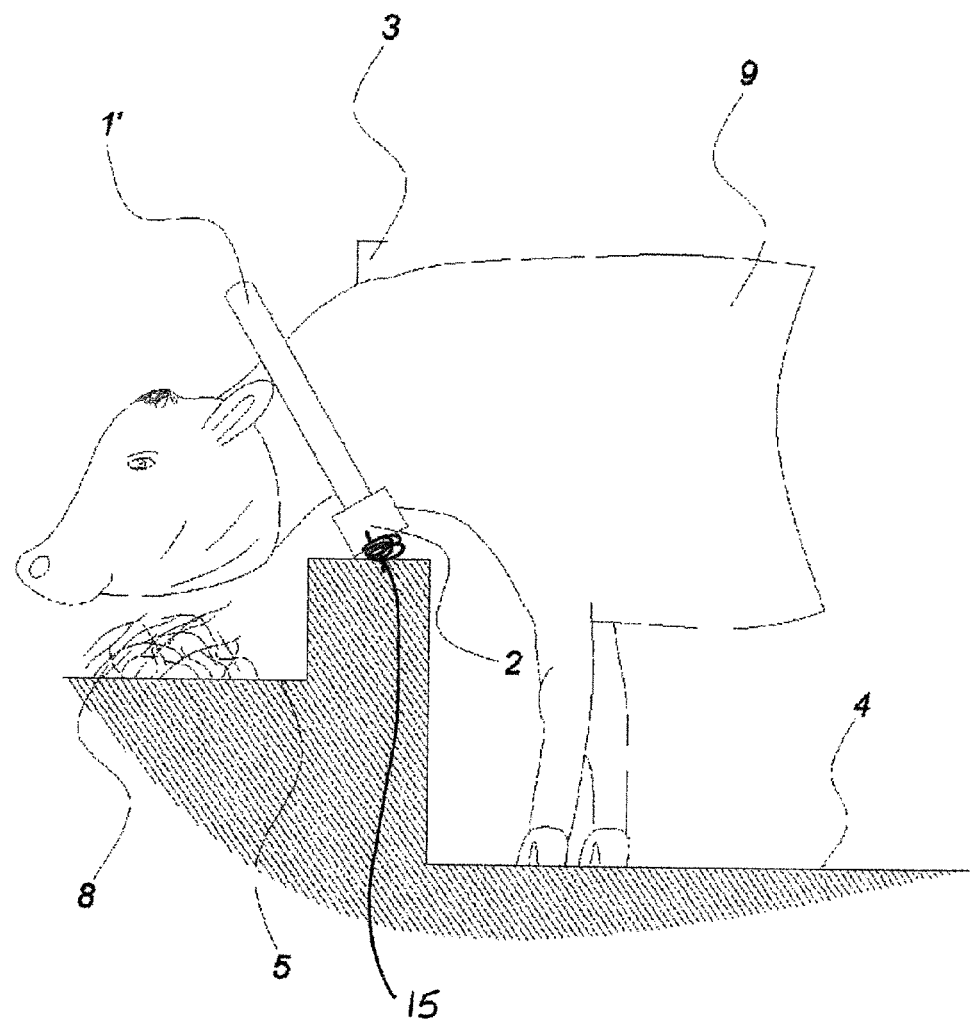
FIG. 2 is the cross-sectional view of FIG. 1 with an animal.

The cross-section in FIGS. 1 and 2 show a feeding stable arrangement comprising a feeding area 4 for holding the animals, such as cows 9, and a feed-holding part in the form of a feeding table 5 for holding the feed 8 for the animals. The feeding area 4 and the feed-holding part 5 are separated by an edge part 6 on the top 7 of which is arranged a feeding fence formed from a number of feeding fence sections 1 supported by means of flexible mounting parts 2 on intermediate upright stationary posts 3. The feeding fence section 1 is biased by the flexible mounting parts 2 to a starting position, which in the examples shown in the drawing is vertical, but which in alternative embodiments may be tilted 5-10° towards the feed-holding part 5. When the animal 9 pushes against the feeding fence section 1 it will tilt towards the feed-holding part 5 to a tilted position of the feeding fence section 1' with a maximum angular deviation α from vertical of 30°, the vertical position being the starting position of the fence section 1 for the present embodiment. In some embodiments, the flexible mounting parts 2 may comprise preferably at least one part of an elastic material 15 which is arranged to be twisted, i.e. act as a torsional spring, when the fence section 1' is in the tilted position and thus provide a biasing force to the fence section to force the tilted fence section 1' toward the starting position, where the biasing force is substantially linearly depending on the angular deviation of the fence section from the starting position. The elastic material may be a natural rubber material, an artificial rubber material, or a combination thereof.

The vertical difference L1 in position of the level of the floor of the feeding area 4 and the feeding table 5 is generally in the range of 15 to 40 cm and in this embodiment about 30 cm and the height of the top 7 of the edge part 6 over the feeding table 5 is generally in the range of 10 to 25 cm and in the present embodiment about 20 cm. The vertical height L3 of the feeding fence section from the top 7 of the edge part 6 is generally in the range of 40 to 60 cm and in the present embodiment about 50 cm.

In this embodiment the fence section 1 rotates around an axis substantially fixed at the bottom part of the feeding fence section 1. Thus, when the cow 9 pushes against the fence section 1 the upper part of the fence section 1 will tilt forward to relive pressure on the shoulder area of the cow 9. And since the axis is fixed—and arranged under the cow's neck—it will also prevent that the cow 9 just takes a further step forward when the fence section gives in to the pressure from the cow 9 and tilts forward.

Figure 3:
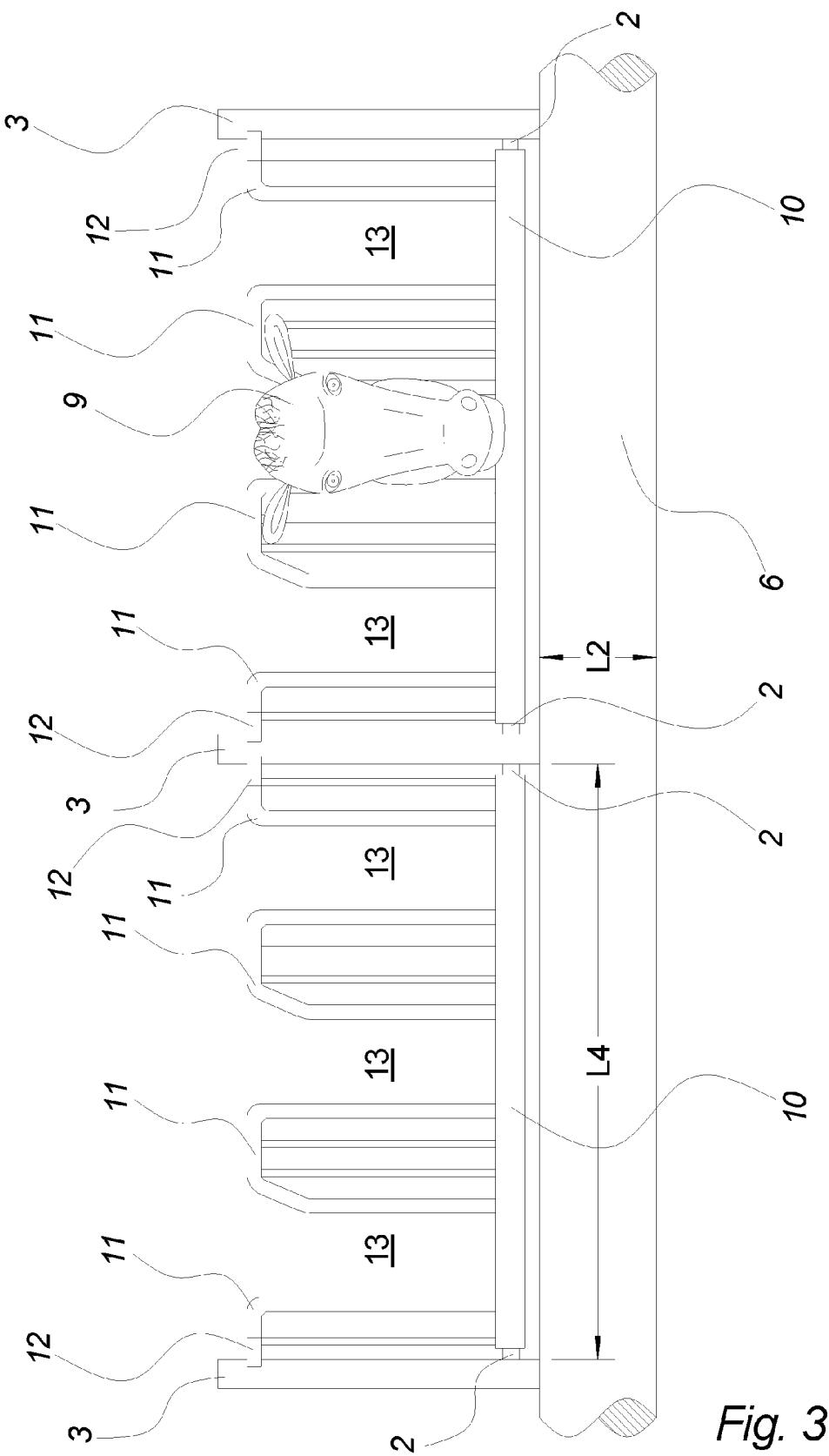
FIG. 3 is a front view of a feeding fence employing one embodiment of a feeding fence section according to the present invention.
Figure 4:
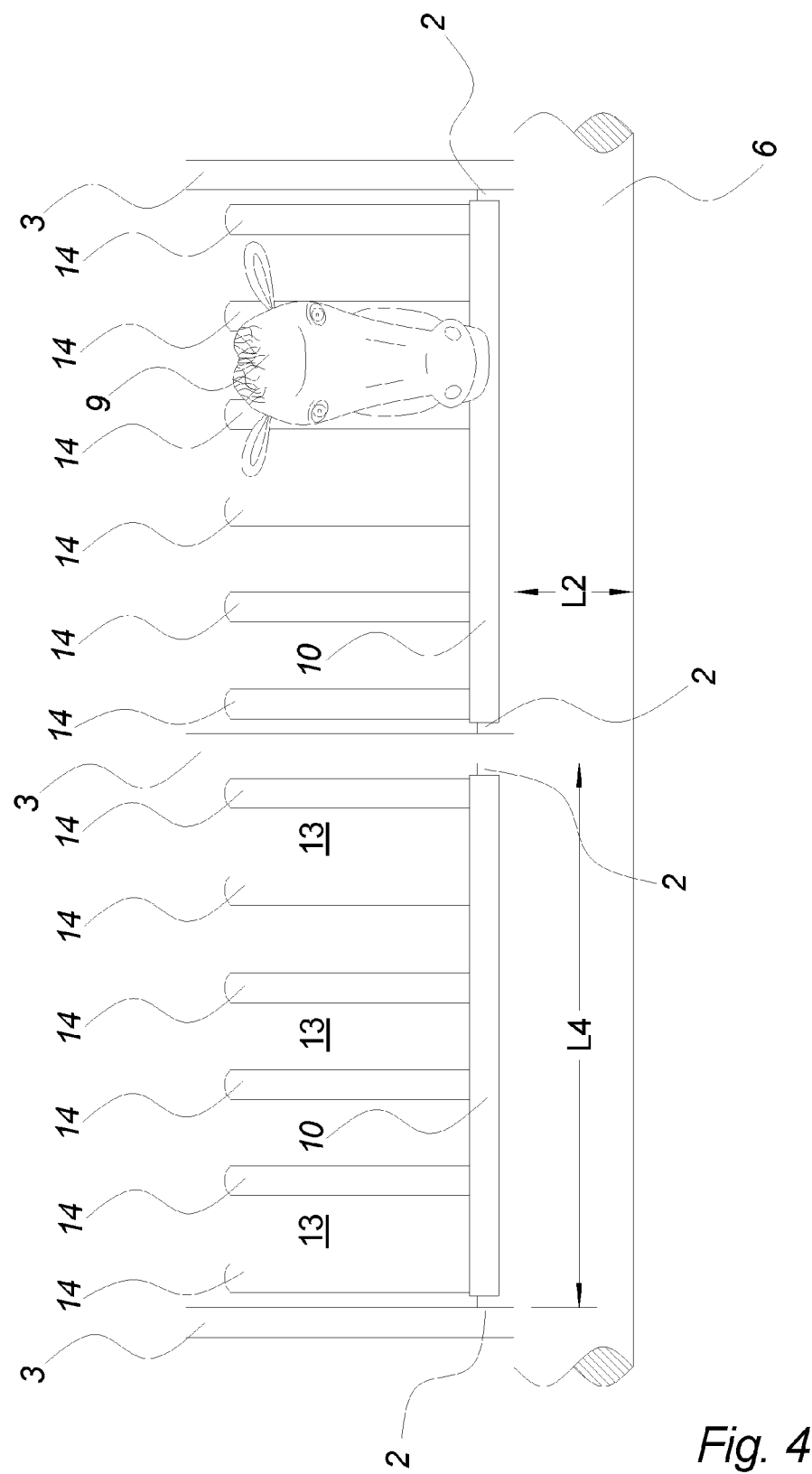
FIG. 4 is a front view of a feeding fence employing another embodiment of a feeding fence section according to the present invention.
Figure 5:
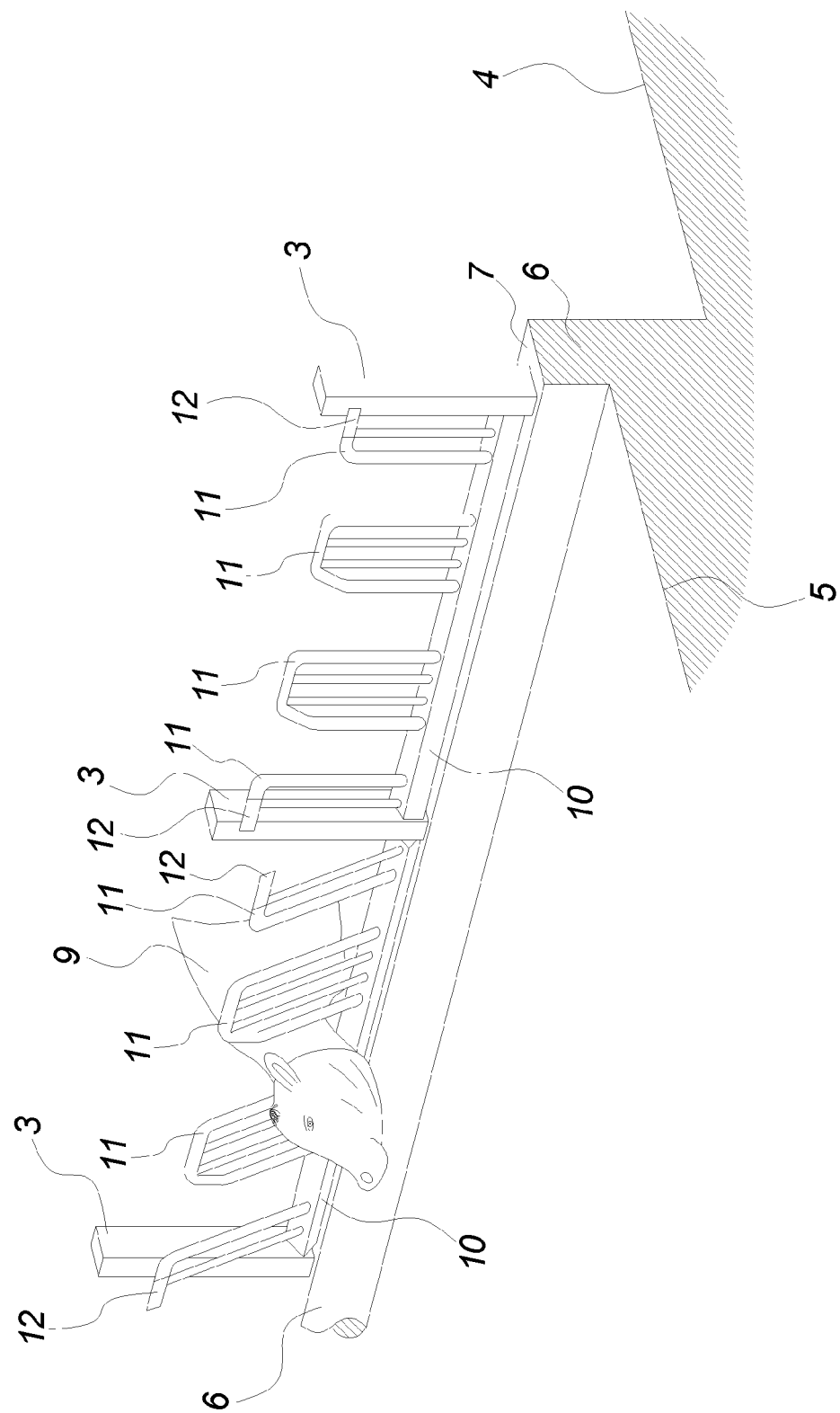
FIG. 5 is a perspective view of a feeding fence in operation employing one embodiment of a feeding fence section according to the present invention.

The feeding fence sections 1 are intended to be arranged to form a feeding fence as shown in FIGS. 3 and 4. The embodiment in FIG. 3 comprises feeding fence sections 1 of a longitudinal extension L4 of about 3 meter and having four separation uprights 11 defining there between three passage openings 13 for the heads of the animals 9. The separation uprights 11 extend from a bottom bar 10, which is connected at each end to the intermediate upright stationary posts 3 via the flexible mounting parts 2 made from rubber. The separation uprights 11 next to the upright stationary posts 3 comprises a tilt stop that engages the posts 3 when the fence section 1 is in the starting position and prevents the feeding fence section 1 from tilting towards the feeding area 4. The separation uprights 11 shown in FIG. 3 are of an ordinary and well-known type and may be replaced with other known types, such as those forming headlock gates.

In principle a single flexible mounting means 2 could be arranged at the middle of the fence section 1 or more than one mounting means 2 could be arranged inside the longitudinal extent of the fence section 1 but in this embodiment flexible mounting means 2 are arranged at either ends of each of the longitudinal extent of the fence section 1.

In this embodiment the flexible mounting means 2 are arranged at the bottom of the fence section 1 so that they are substantially aligned with the axis around which the fence section is capable of rotation. However in another embodiment the flexible mounting means 2 could be arranged at the top of the fence section 1, anywhere along the vertical extent of the fence section 1 or even displaced from the fence section 1.

A feeding fence with a different embodiment of the feeding fence section 1 according to the present invention is shown in FIG. 4. Each feeding fence section 1 comprises a number of upright tube members 14 each attached at a lower end to a horizontal longitudinal bottom bar 10 of the feeding fence section 1 and extending to an upper free end of the member 14. The upright members 14 are hollow tubes made from a deflectable material, in this case from PPR, but other suitable plastic materials such as polyethylene or other types of polypropylene, possibly a plastic material reinforced with a fibre material, could be employed. The tube members 14 are arranged on the bottom bar 10 with a mutual distance of 35 cm which allows a cow to place its head between two neighbouring upright tube members 14, which may deflect to the sides, i.e. in the longitudinal direction of the feeding fence section 1 while the whole feeding fence section 1 may tilt forward by being pushed by the animal. When more cows are present at the feeding fence 1, they will normally occupy every second space between the upright tube members 14, so that at least two of the members 14 will be situated between two neighbouring animals.

LIST OF REFERENCE NUMERAL

1 Feeding fence section in starting position
1' Feeding fence section in tilted position
2 Flexible mounting part
3 Upright stationary post
4 Feeding area
5 Feeding table
6 Edge part
7 Top of edge part
8 Feed
9 Cow
10 Bottom bar
11 Separation uprights
12 Tilt stop
13 Passage openings for the heads of animals
14 Upright tube members
15 Twisted elastic material
L1 Vertical distance between level of floor in feeding area and level of feeding table
L2 Vertical distance between level of feeding table and level of top of edge part
L3 Vertical distance between level of top of edge part and top of feeding fence section
L4 Longitudinal extend of feeding fence section
α Angle between feeding fence section in the starting position and in the tilted position

The invention claimed is:

1. A feeding fence assembly for separating a feeding area for animals and a feed-holding part, the feeding fence assembly comprising:
   a feeding fence section having an upper end, the feeding fence section having at least one passage opening for the heads of animals, each passage opening being open at the upper end of the feeding fence section for allowing the animals to insert and retract their heads from the upper end of the passage opening; and
   at least one flexible mounting element configured and operable so as to allow the fence section to be angularly displaced by said animals from a starting position towards a tilted position about a substantially horizontal axis extending in a longitudinal direction of said fence section, the mounting elements biasing the fence section from said tilted position towards said starting position.

2. A feeding fence assembly according to claim 1, wherein the at least one flexible mounting elements is arranged to bias the fence section with a biasing force that is a function of the angular deviation (α) of the fence section from the starting position.

3. A feeding fence assembly according to claim 1, wherein the starting position is a substantially upright position.

4. A feeding fence assembly according to claim 1, wherein the maximal deviation of the fence section from an upright position is in the range of 25° to 35°.

5. A feeding fence assembly according to claim 1, wherein the at least one flexible mounting element comprises at least one part of an elastic material which is arranged to be twisted when the fence section is in the tilted position and thus provide biasing force to the fence section.

6. A feeding fence assembly according to claim 5, wherein the elastic material is selected from the group consisting of: a natural rubber material, an artificial rubber material and a combination thereof.

7. A feeding fence assembly according to claim 5, wherein the at least one flexible mounting element are arranged to be connected to stationary vertical posts for supporting the feeding fence section.

8. A feeding fence assembly according to claim 1, comprising a plurality of upright members each attached at a lower end to a horizontal longitudinal bottom bar of the feeding fence section and extending to an upper free end of the member, wherein the upright members are hollow tubes made from a deflectable material.

9. A feeding fence assembly according to claim 8, wherein the distance between the neighboring upright members is in the range from 15 to 50 cm.

10. A feeding fence assembly according to claim 1, wherein a length (L4) of the section in the longitudinal direction is in the range of 1.5 to 6 meters.

11. A feeding fence assembly according to claim 1, wherein said substantially horizontal axis is arranged to extend at a bottom part of said feeding fence assembly.

12. A feeding fence assembly according to claim 1, wherein said at least one flexible mounting element is arranged at a first longitudinal end of said feeding fence assembly and wherein said at least one flexible mounting element is also arranged at an opposite longitudinal end of said feeding fence assembly.

13. A feeding fence assembly according to claim 1, wherein said at least one flexible mounting element are arranged at a bottom part of said feeding fence section.

14. A feeding fence assembly according to claim 1, which comprises a plurality of upright stationary posts between which a plurality of the feeding fence sections are arranged.

15. A feeding arrangement in a stable comprising a feeding area for the animals, a feed-holding part, and a feeding fence assembly according to claim 1, wherein the feeding fence section is arranged such that the feeding fence assembly is operable for separating the feeding area and the feed-holding part.

16. A feeding arrangement according to claim 15, wherein the feed-holding part is of an elongated shape and the feeding fence assembly extends in parallel with said feed-holding part.

* * * * *